US00RE35403E

United States Patent [19]

Dyke

[11] E Patent Number: Re. 35,403

[45] Reissued Date of Patent: Dec. 17, 1996

[54] ENCRYPTION PRINTED CIRCUIT BOARD

[75] Inventor: John Dyke, West Valley, Utah

[73] Assignee: MIU Industries Ltd., Pacific Centre, Canada

[21] Appl. No.: 183,771

[22] Filed: Jan. 21, 1994

Related U.S. Patent Documents

Reissue of:

[64] Patent No.: 4,797,928
Issued: Jan. 10, 1989
Appl. No.: 1,206
Filed: Jan. 7, 1987

U.S. Applications:

[63] Continuation of Ser. No. 837,594, Feb. 20, 1992, abandoned, which is a continuation of Ser. No. 539,927, Jun. 18, 1990, abandoned.

[51] Int. Cl.[6] ..... H04L 9/00; H04K 1/00

[52] U.S. Cl. ..... 380/49; 380/4; 380/21; 380/23; 380/25; 380/29; 380/44

[58] Field of Search ..... 380/21, 23, 25, 380/29, 44, 49, 4

[56] References Cited

U.S. PATENT DOCUMENTS

| | | | |
|---|---|---|---|
| 3,764,742 | 10/1973 | Abbott et al. | 380/23 |
| 4,123,747 | 10/1978 | Lancto et al. | 380/29 |
| 4,262,329 | 4/1981 | Bright | 364/200 |
| 4,465,901 | 8/1984 | Best | 380/4 |
| 4,503,287 | 3/1985 | Morris et al. | 380/49 |
| 4,588,991 | 5/1986 | Atalla | 380/25 |
| 4,670,857 | 6/1987 | Rackman | 380/23 |

FOREIGN PATENT DOCUMENTS 2131586 6/1984 United Kingdom .

*Primary Examiner*—Stephen C. Buczinski
*Attorney, Agent, or Firm*—Neil H. Hughes; Ivor M. Hughes

[57] ABSTRACT

An encryption printed circuit board (PCB) for use as an add on board to a host computer includes address registers, read/write controller, and data information transceiver adapted for connection to the host computer. The addresses registers are connected to a memory decode, auto-start PROM, I/O decoder and register select. The memory decoder is connected to the autostar, PROM and the I/O decoder is connected to the register select. A bus logic circuit is connected to the read/write controller, and outputs read/write signals to the data information transceiver and register select. The data information transceiver is connected to the autostart PROM and to a plurality of data registers for receiving instructions from the auto-start PROM and inputting or receiving information from the data registers pursuant to instruction of the auto-start PROM program, and selection of the appropriate registers by the register select. A cipher processor, microprocessor, low address latch and memory, program, and buffer are connected to the data registers. The microprocessor is connected to a card reader through a card reader interface, and to an upper address decoder and the memory, program, buffer. Upon receipt of a load key instruction from the PC the microprocessor loads the key and a block of information from the input register into the cipher processor for either encryption or decryption and the processed block of information into the information output register for output to the PC upon receipt of a write instruction.

16 Claims, 6 Drawing Sheets

ENCRYPTION PRINTED CIRCUIT BOARD

Matter enclosed in heavy brackets [ ] appears in the original patent but forms no part of this reissue specification; matter printed in italics indicates the additions made by reissue.

*This application is a continuation of U.S. application Ser. No. 07/837,594, filed Feb. 20, 1992, now abandoned, which was a continuation of U.S. application Ser. No. 07/539,927, filed Jun. 18, 1990 now abandoned, which was a Reissue of U.S. application Ser. No. 07/001,206 now U.S. Pat. No. 4,797,928.*

BACKGROUND OF THE INVENTION

This invention relates to cryptographic devices and more particularly to an encryption printed circuit board.

Various system have been developed in the prior art for enciphering digital information to improve the security and privacy of data within data processing systems, during transmission over telecommunications networks, and during storage on media such as magnetic tape and disk. Examples of such cipher systems may be found in U.S. Pat. Nos. 3,798,359 and 3,958,081.

In known cipher systems the bits of the information to be enciphered are rearranged or replaced by substitute bits under control of a secret cipher key. To decipher the enciphered operation the substitution is reversed. Enciphering methods have been combined to provide secure ciphers. For example, the bits have been transposed prior to substitution, groups of bits have been substituted, combining using exclusive OR, and these techniques have been altered several times during the enciphering and deciphering process. Such cipher systems are practically unbreakable without testing all possible keys and the key can be made large enough to make such testing prohibitively time consuming.

Thus, for piracy to be profitable access to the key is necessary. Various systems have been devised to keep the key from being accessed through the computer. Such systems have included separating the enciphering system from the computer wherein the computer calls for information and gets the results only.

The essential difference between the known prior art devices and the present invention is the provision of an encryption printed circuit which is an IBM half-sized printed circuit board with complete interface to a card reader. The technique used by the encryption printed circuit is known as the National Bureau of Standards Data Encryption Standard (DES) whose DES function is provided by a low cost, high performance integrated circuit having a microprocessor which automatically handles many of the DES functions. The use of the microprocessor unburdens the host system which provides greater transfer speed of information and increased security of the information.

SUMMARY OF THE INVENTION

Accordingly, it is an object of this invention to provide a secure and versatile encryption device.

Another object of the invention is to provide an encryption device employing an internationally known method for making secure corporate data bases, information stored on tape, floppy diskettes, and data communications.

Still another object of the invention is to provide a low cost, high performance encryption device capable of performing automatically many of the National Bureau of Standards Data Encryption Standard (DES) functions.

Yet another object of the invention is to provide an encryption device capable of preventing the linking together of different files in storage.

Still yet another object of the invention is to provide an encryption device usable to secure files on hard disk or floppy diskette as well as to protect data bases, information being transmitted to another site, and dial-up access.

Briefly stated the encryption device constituting the subject matter of this invention includes a printed circuit board having a computer connected to a ciphering processor. The ciphering processor encrypts and decrypts data using the National Bureau of Standards encryption algorithm. The printed circuit board is connected to a host computer for receiving blocks of clear or encrypted data and commands for automatically starting the ciphering process. The encryption PC board scrambles the information by means of a key. The key is read into the PC board from a card reader whenever data is to be encrypted or decrypted, the data decrypted or encrypted as directed, and returned to the host processor. Thus, the host computer never sees the key that was used. A secondary key is used to prevent file linking together different files in storage. As the host computer never "sees" the keys, the keys cannot be found in the memory of the host computer.

BRIEF DESCRIPTION OF THE DRAWINGS

Other objects and features of the invention will become readily apparent from the following detailed description when read in conjunction with the drawings in which.

DETAILED DESCRIPTION OF THE PREFERRED EMBODIMENT

Figure 1:
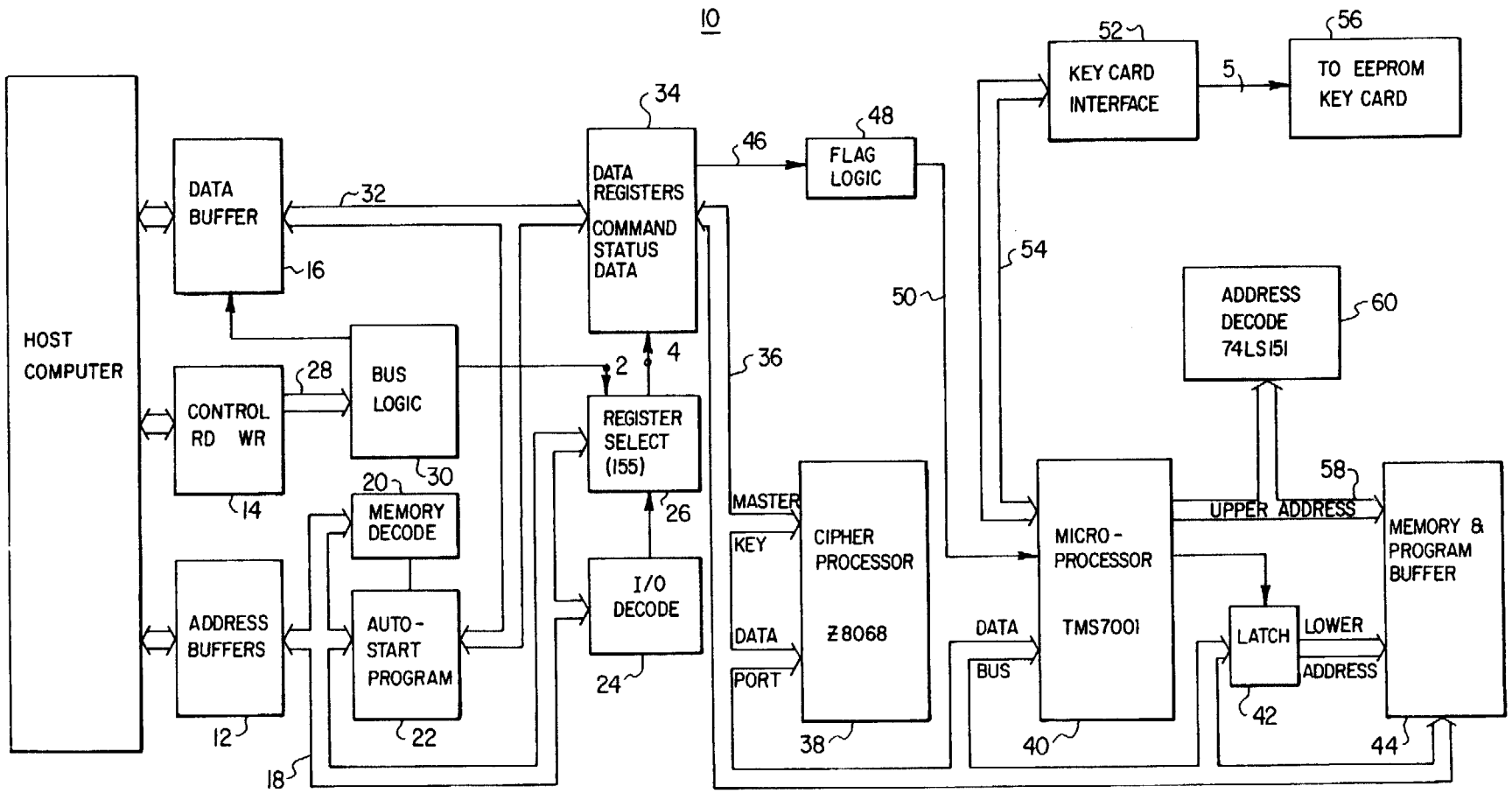
FIG. 1 constitutes a schematic diagram in block form of the encrypted printed circuit board of the present invention.

The encryption printed circuit board 10 (FIGS. 1 and 2a–2d) includes a printed circuit board with complete interface to a card reader. The board is provided with a special software driver, and includes an auto-start PROM command. A simple driver installation is performed once for each system configuration. From that point on, encrypting or decrypting is performed by file. All programs are menu driven for ease of use. A drive letter may be specified or a new drive may be created in the random access memory (RAM); this gives greater flexibility to the system.

The encryption printed circuit board (PCB) can encrypt in either a binary code or in ASCII.

Binary encryption utilities the conventional eight bit cipher feedback method designated by the National Bureau of Standards Data Encryption Standard (DES) used in most encrypters. It takes all clear data (unencrypted) and turns it into a stream of random characters, any one of which can be of any value between OO and FF (256 possible combinations). All data is crypted, including control characters that may be used for MODEM and equipment control.

ASCII encryption is an implementation of cipher feedback called "Safe Talk". Safe Talk works by encrypting on "printable characters" and passes control characters through without encryption. Printed characters are in the 20 to 7E hexadecimal range. All "handshake", control and command characters are left untouched. "Safe Talk" mode of operation allows encryption to be used in places where conventional encryption is not suitable.

The encryption PCB is capable of a two mode operation. The first mode is a security mode used to secure the flies on hard disk or floppy diskette. In this mode, individual files or entire diskettes are encrypted. The second mode of operation is an access or communications security device. This mode is used to protect data bases and information being transmitted to another site, and to prevent dial-up access. This protect mode requires only that all the communications be routed through the encryption PCB; the result is that all communications between host look like random data and cannot be understood.

The host computer may be, for example, an IBM Personal Computer which consists of the system unit, the keyboard, a display, and printer. The system unit contains a 16-bit microprocessor, read-only memory (ROM), random access memory (RAM), power supply, speaker, and five expansion slots to allow easy expansion of the system. The system unit houses two floppy diskette drives attached thereto by a diskette adapter located in one of the five system-bus slots. The encryption PCB of the present invention is an adapter card located in one of the five system-bus slots. It is compatible with the IBM PC.

The encryption printed circuit board, hereinafter referred to as the PCB (FIG. 1) includes a plurality of address buffers 12, a read and write control 14 and a data buffer 16 connected to the IBM PC.

The address buffers 12 are connected to bus 18. Bus 18 interconnects the address data of the address buffers to a memory decode 20, an auto-start programmable read only memory (PROM) 22, an I/O address decoder 24, and register selector 26. The memory decoder 20 is connected to the auto-start program PROM for initialization and the I/O decoder 24 is connected to the register select for initialization of the register select.

The read, write controller 14 is connected by bus 28 to bus control logic. The bus logic outputs read, write control signals to the data buffer 16 and to the register selector 26. The data buffer 16 is connected to bus 32. Bus 32 interconnects the data buffer 16, a plurality of data registers 34, and the auto-start program PROM 22.

The data registers 34 are connected to a bus 36. The bus 36 interconnects the data registers 34, cipher processor 38 (which includes a master and secondary key port and a data port), a microprocessor 40, low address latch 42, and memory, program and buffer 44.

The data registers 34 are also connected by a lead 46 to a flag logic circuit 48 whose output is connected by lead 50 to the microprocessor 40.

A key card interface 52 is connected by bus 54 to information input terminals of the microprocessor 40. A key card reader 56 which is, for example, an EEPROM is connected to the key card interface 52. The interface provides the key and secondary key to the microprocessor for the cipher processor.

The microprocessor 40 output terminals are connected to an upper address bus 58. The upper address bus 58 connects the microprocessor to an address decoder 60 and to the memory and program and buffer 44. The upper and lower addresses operate in the memory, program and buffer 44 to output the processed data to the information data register of data registers 34.

Referring now to FIGS. 2a–2d, a more detailed description of a slightly modified encryption PCB is given. The address buffers 12 and read, write control 14 includes a plurality of address buffer memories 70, 72, and 74 having connectors for connection to the address I/O bus of the host computer and a transceiver 16 having connectors for connection to the data memory bus of the host computer for reading clear or encrypted information from the PC for encryption or decryption and writing information into the PC.

Figure 2A:
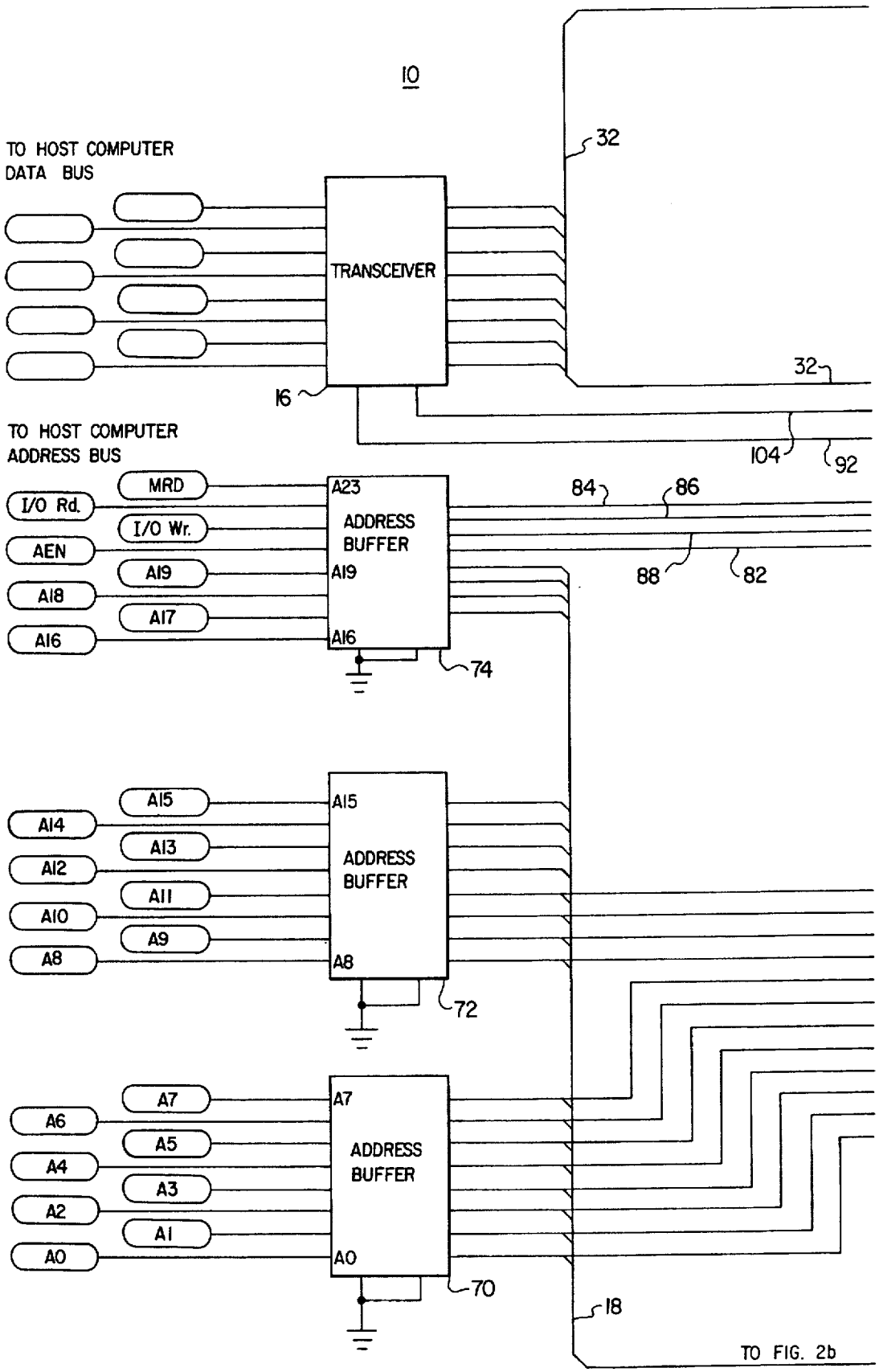
FIGS. 2a–2d show in greater detail a slightly modified schematic diagram in block form of the encryption printed circuit board.
Figure 2B:
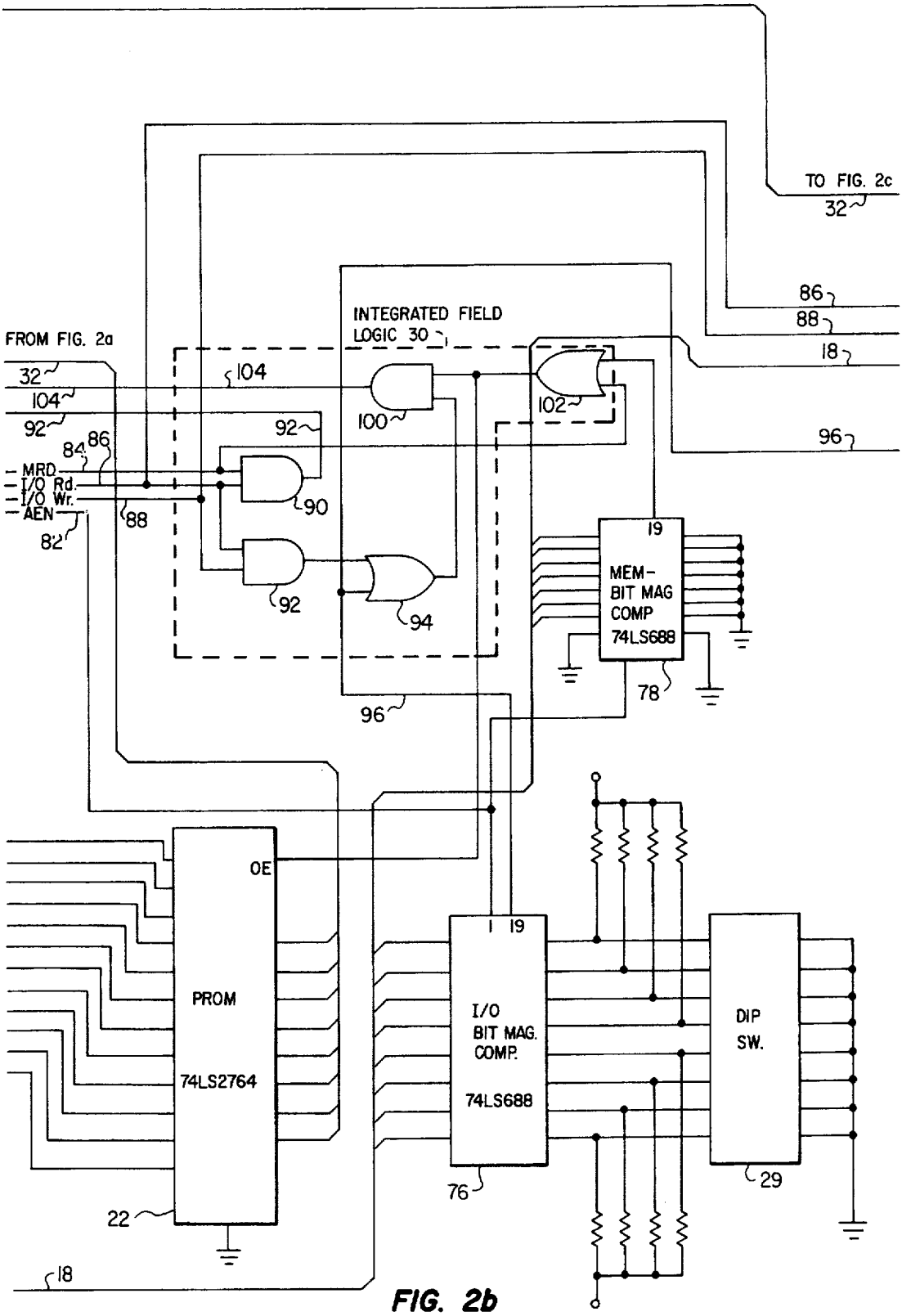
Figure 2C:
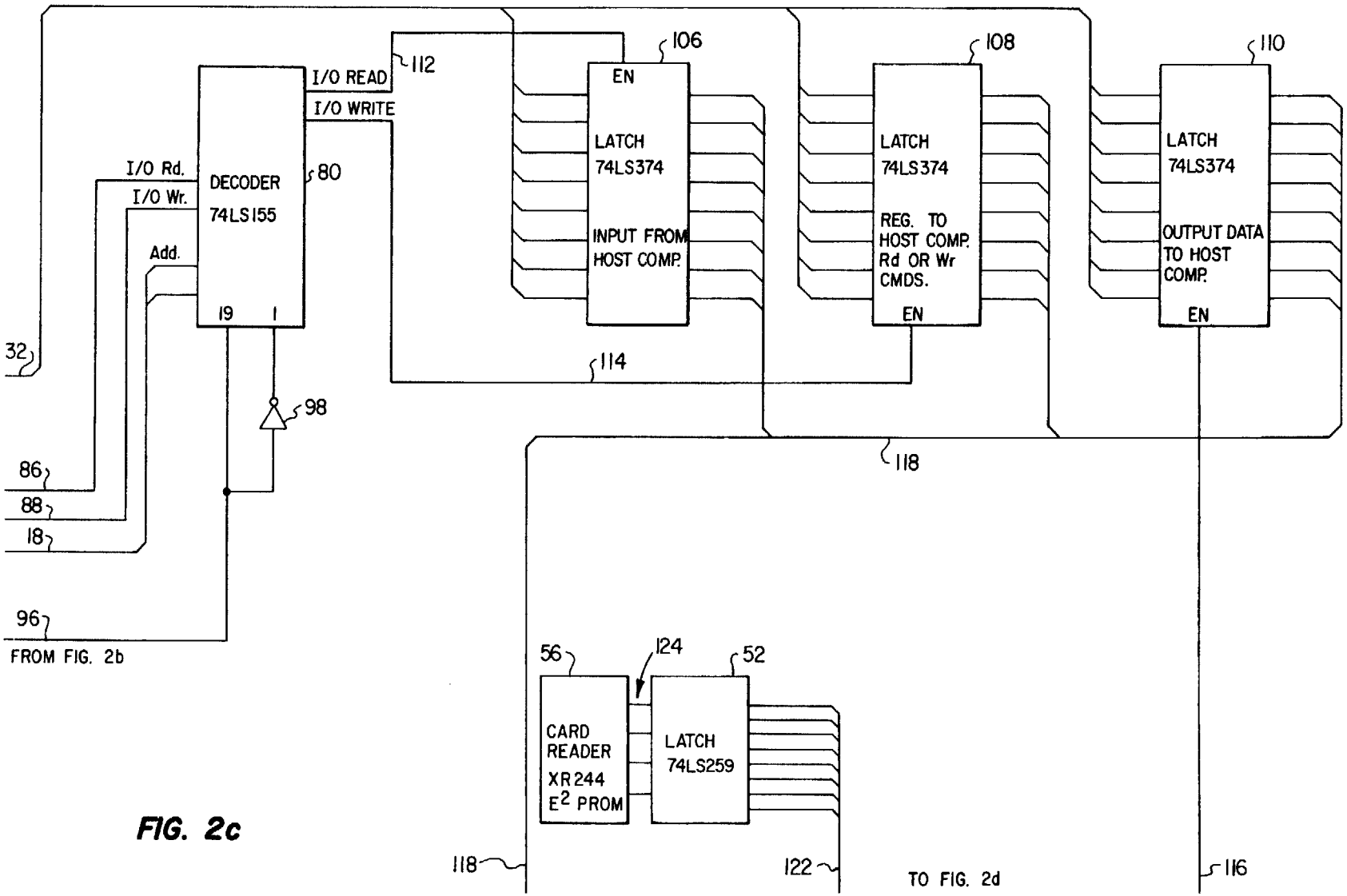
Figure 2D:
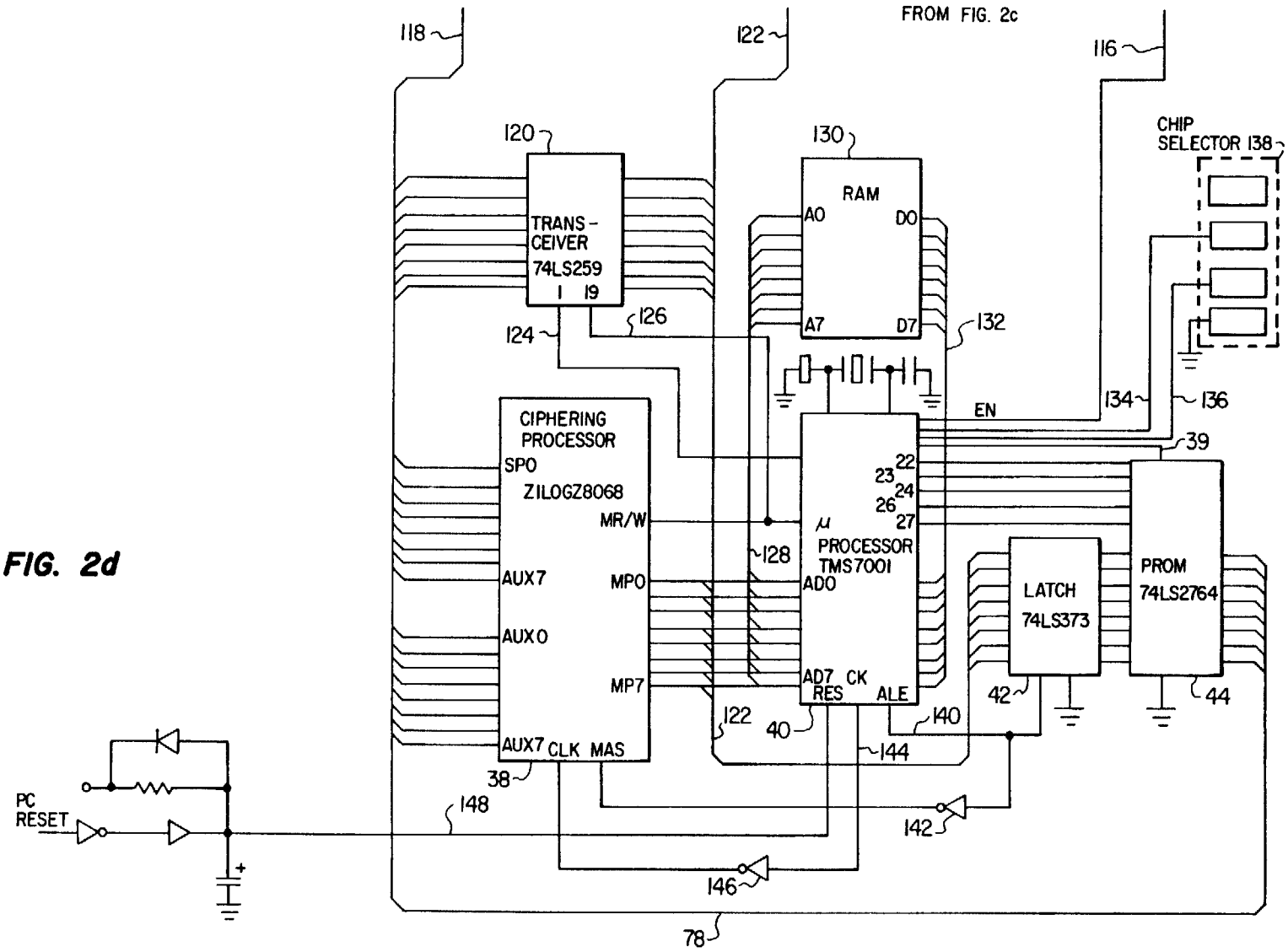

The address buffer 70 has eight (AO–A7) data output terminals connected to bus 18 and to eight terminals of an auto-start PROM 22 (FIG. 2b). Address buffer 72 (FIG. 2a) has eight (A8–A15) data output terminals connected to bus 18 of which four (A8–A11) are also connected to the auto-start PROM 22 (FIG. 2b). While, the address bus 74 (FIG. 2a) has four data output terminals (A16–A19) connected to bus 18 and four output terminals (A20–A23) connected to the integrated field logic device 30 (FIG. 2b). Bus 18 is connected in turn to I/O bit magnitude comparator 76, memory bit magnitude comparator 78, and to a read/write decoder 80 (FIG. 2c). The I/O bit magnitude comparator 76 is connected to a dip switch 29 which allows the address of a block of eight port addresses to be moved in the address space by setting a new value in the bank of dip switches.

The twenty terminals (A0–A19) of the address buffers 70, 72, and 74 are output-only signals that are used to address the system-bus attached memory and I/O. These 20 signals are driven by the PC during system-bus cycles for memory and I/O read and write. With 20 address lines, it is possible to address one megabyte of system memory.

The PC through the use of the IN and OUT instructions, can address up to 64K L/O port addresses. The port addresses are also carried on the address bus on lines A0 through A15. Lines A16 through A19 are not used and are held inactive during I/O port bus cycles. However, on the PC only address lines A0 through A9 are used for addressing I/O ports. In addition, only I/O port addresses in the range 0200 HEX to 03FF HEX are valid on the system bus, generally. The terminals (A20 through A23) receive the memory read, I/O read, I/O write, and AEN control signals. The PCB address registers are compatible with the PC bus.

The AEN terminal A20 (FIG. 2a) is connected by lead 82 to the Enable terminals of the bit magnitude comparators 76 and 78 (FIG. 2b).

The memory read address output data terminal, the I/O read and I/O write terminals are connected, respectively, to leads 84, 86, and 88 (FIGS. 2a and 2b). The memory read lead 84 and I/O read lead 86 are connected to AND gate 90, (FIG. 2b) and the I/O read and I/O write leads 86 and 88 are connected to the junction of a normally high output AND gate 92 and to the decoder 80 (FIG. 2c). The output of AND gate 90 (FIG. 2b) is connected by lead 92 to the enable terminal of transceiver 16 (FIG. 1a).

The output of AND gate 92 (FIG. 2b) is connected to an input terminal of an OR gate 94. A second input of OR gate 94 is connected by lead 96 to the junction of clock terminals of the bit magnitude comparator 76 and the decoder 80 (FIG. 2c). The signal on terminal 19 of the decoder 80 is inverted by an inverter 98 and applied to the enable terminal of the decoder 80.

The output of OR gate 94 (FIG. 2b) is connected to a first input of AND gate 100. The second input terminal of AND gate 100 is connected to the junction of an enable output terminal of PROM 22 and the output of an OR gate 102. OR gate 102 has a first input terminal connected to clock terminal of the memory bit magnitude comparator 78 and a second input terminal connected to the memory read lead 84. The output of AND gate 100 is connected by lead 104 to a second clock terminal of transceiver 16 (FIG. 1a) for reading data information in and writing it out of the encryption PCB, The transceiver 16 data leads (D0–D7) are connected to bus 32. These eight lines axe bidirectional data lines used to transmit data between the PC, memory and I/O, and I/O ports. During PC initiated write bus cycles, data ate presented on the bus 32 for writing into memory or I/O ports, Data axe valid slightly before the back ming edge of the I/OW or MR control signals. The rising edges of these signal are usually used to clock the data on the data bus into memory or I/O port registers. During PC initiated read bus cycles, the addressed memory or I/O port register must place their data on the data bus before the rising edge of the I/O or MR control signals. During direct-memory access cycles, the data bus is used to transfer data directly between an I/O port and memory.

Bus 32 is also connected to corresponding data terminal of the auto-start PROM 22 (FIG. 2b) and plurality of registers 34 including registers 106, 108 and 110 (FIG. 2c). Register 106 has its enable terminal connected by lead 112 to the I/OR terminal of decoder 80 and when enabled stores the information input from the PC for processor in the cipher processor controlled by the microprocessor. Register 108 has its enable terminal connected by lead 114 to the I/OW terminal of decoder 80, and stores command status signals from the PC. While, the register 110 has its enable terminal connected by lead 116 to the output enable terminal of a microprocessor 40 for receiving the processed information, all as follows. A suitable microprocessor is a TMS 7001 microprocessor.

The registers 106, 108, and 110 have terminals (0–7) connected to bus 118. Bus 118 is also connected to terminals of a transceiver 120 (FIG. 2d), to the cipher text terminals (SP0–SP7), and master key terminals (AUX-0-AUX7) of a ciphering processor 38 and to the data output terminals of a PROM 44. A suitable cipher processor is a Zilog Z8086 manufactured by Zilog, Inc.

The master port terminals (MP0–MF7) of the ciphering processor 38 are connected to bus 122 and to the address (A0–A7) terminal of the microprocessor 40. The bus 122 is also connected to the lower address latch 42, transceiver 120, and key card interface latch 52 (FIG. 2c). The key card interface latch is connected by bus 124 to card reader 56. A suitable card reader is an XR244 (EEPROM).

The transceiver 120 (FIG. 2d) has its terminals connected between bus 118 and bus 122. Its enable terminal Pin 1 is connected by lead 124 to the enable terminal of microprocessor 40, and its other enable terminal 126 connected to the junction of the MR/W terminal of the ciphering processor 38 and microprocessor 40.

The microprocessor address terminals (A0–A7) are also connected by lead 128 to corresponding address terminals of a storage RAM 130 for storing processed information. Storage RAM 130 has its data output terminals (D0–D7) connected by lead 132 to the corresponding data terminals of the microprocessor 40.

The microprocessor 40, also has upper address terminals (PINS 22-14 and 26, 27) and an enable terminal (PIN 39) connected to the enable terminals of PROM 44. Also, output enable terminals are connected by leads 134 and 136 to output enable terminals of a chip selector 138.

ALE, CK, and RES terminals complete the active terminals of the microprocessor 40. The ALE (address latch enable) terminal is connected by lead 140 to the junction of the latch 42 and to an inverter 142 connected to the master port address strobe (MAS) of the ciphering processor 38. Latch 42 is for multiplexing the lower address from the data. ALE is an output-only signal driven by the microprocessor. It is used to indicate that the address bus is now valid for the beginning of a bus cycle. This signal goes "active high" just prior to the address bus being valid and goes inactive just after the address bus is valid. This signal latches the address information from the local address/data bus. The microprocessor clock terminal is connected by lead 144 through an inverter 146 to the clock terminal of the ciphering processor 38. While the RES (reset) terminal is connected by lead 148 to the reset output of the PC.

Selected port addresses received on registers 70, 72, and 74 (FIG. 2a) are addressed by the PROM 22 (FIG. 2b) and input to the bit magnitude comparators 76 and 78. The PROM is for decoding port addresses widely different on the card. Thus, the PROM 22 generates the decode outputs, The address input signal to a PROM decode is a unique output bit pattern that is written into the PROM at manufacture. The output of the PROM is to the memory transceiver and registers 106, 108, and 110.

The bit magnitude comparators 76 and 80 allow the address of a block of port addresses to be moved in the address space by setting a new value in a bank of dip switches. On one side of the compare circuit 28, the address bits and bus signal AEN are attached. On the other side, the output of the dip switches is attached. When the value set in the dip switches equals the value on the address bus, the compare equal output is activated and can be used as the group select control signal. The group select signal is connected to the junction of the MR/W portion of the integrated field logic and decoder 80. In the integrated field logic the group select signal of bit magnitude comparator 78 is ORed and ANDed with the group output signal of the memory bit comparator and input to the transceiver 16.

In operation the microprocessor 40 pursuant to a load key (master or secondary or both) instruction from the PC cycles through a memory-read bus cycle, memory write bus cycle, I/O port read bus cycle and I/O write bus cycle.

The I/O port read bus cycle is initiated each time an IN instruction is executed. It fetches data from one of the I/O port addresses in the I/O port address space. The ALE bus signal is activated indicating that address bus bits contain a valid I/O port address. Next, the I/OR bus control signal is activated indicating both that the bus cycle is an I/O port read cycle and that the addressed port should respond by driving the data bus with its contents. Then the PC samples the data on the data bus an I/OR bus signal is deactivated.

The memory-read bus cycle is then begun to fetch instructions and data for the microprocessor memory. At the beginning the ALE signal goes active. The back edge of this signal indicates that the address bus contains a valid memory address. Next, the MR bus signal is activated. This indicates to the devices attached to the bus that the cycle is a memory-read cycle, and all devices addressed should drive the data bus with its contents through the ciphering processor for either encryption or decryption as selected. Then, the microprocessor captures the data from the data bus.

Next, an I/O port write bus cycle is initiated pursuant to an OUT instruction to write data to a specific I/O port address in the I/O address space of the microprocessor. The ALE bus signal is activated and indicates that the address bus contains a valid port address. Next, the bus control signal I/OW is activated to indicate that the bus cycle is an I/O port write cycle and that the selected port address should take data from the data bus. Then the microprocessor drives the data bus with the data for the port address. Then the I/OW bus control signal is deactivated.

Finally, a memory-write bus cycle is initiated by an instruction to write data to a memory location. The microprocessor and its bus buffers drive an address onto the system bus, indicating the address of the memory location that should accept the data. In addition the microprocessor drives the data bus with the data that is to be written in the selected memory location. As with the other bus cycles, the ALE bus signal is activated to indicate that the address bus contains a valid memory address. Next, the MW bus signal is activated indicating that the bus cycle is a memory-write cycle. Then the microprocessor drives the system data bus with either the encrypted or the decrypted data that are to be written into the selected memory location and the MW bus signal is deactivated.

Figure 3:
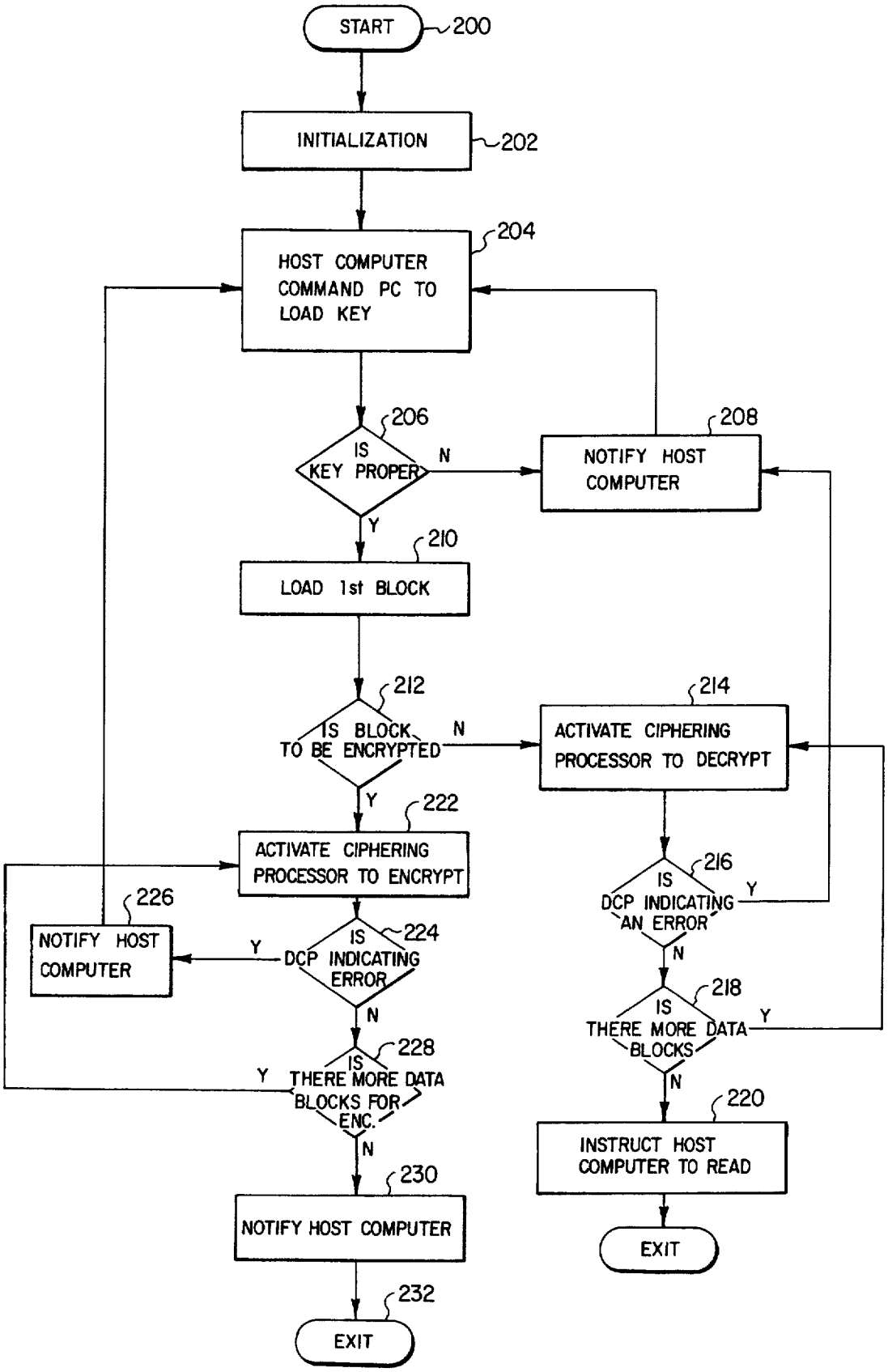
FIG. 3 is a flowchart for the operation of the encryption printed circuit board.

The encrypted printed circuit board operation is now described with reference to a flowchart (FIG. 3). At start 200 an instruction 202 is issued to initialize the system. Then the PC issues a command to load encryption key, and a decision 206 is made whether the key is proper. If not a proper key, an instruction 208 is issued to notify the PC and return is made to instruction 204; else an instruction 210 is issued to load the first block of data. Next, a decision 212 is made whether the block of data is to be encrypted; if not an instruction 214 is issued to activate the ciphering processor to decrypt the block of data. During description a decision 218 is made whether the data ciphering processor is indicating an error, if true, return is made to instruction 208 and an instruction is issued to notify the PC and return to instruction 204. If decision 216 is that no error is being indicated, a decision 218 is made whether the first block of data for decryption has been completed, and whether any additional blocks of data remain for decryption. If decision 218 is yes, return is made to instruction 214; else, an instruction 220 is issued to the PC to read the decrypted data into memory and exit.

Otherwise, if decision 212 is true, an instruction 222 is issued to activate the ciphering processor to encrypt the block of data. Next, a decision 224 is made whether the data ciphering processor is indicating an error; if yes an instruction 226 is issued to notify the PC and return is made to instruction 204; else a decision 228 is made whether encryption of the block of data is complete and whether any more blocks of data are to be encrypted. If decision 228 is that the first block of data has been encrypted but additional blocks are to be encrypted return is made to instruction 222 to encrypt the additional blocks; else an instruction 230 is issued to notify PC that the data has been encrypted and exit made.

Although only a single embodiment of the invention has been described, it will be apparent to a person skilled in the art that various modifications to the details of construction shown and described may be made without departing from the scope of this invention.

What is claimed is:

1. An encryption/decryption apparatus for a host computer having expansion slots for an expander board comprising:

an expander board for connection to a host computer's expansion slot, said expander board including:

an address storage means, a control read/write means, and a data storage means for operative connection to a host computer, the address means for storing addresses for a block of data received from the host computer for ciphering and the read/write control means for receiving ciphering operational commands from the host computer including memory read. I/O read, I/O write, and enable control signals;

an auto-start means connected to the address storage means, control read/write means, and data storage means for coordinating the data addresses of the host computer with addresses for the expander board;

a register selector means connected to the auto-start memory means and to the control read/write means for outputting register selector signals;

a register means including a data input register connected to the control read/write means and data storage means and responsive to an I/O read enabling signal for storing the host computer's data for ciphering, a read/write command status register connected to the control read/write means and responsive to an I/O write signal for storing the host computer's command status signals, and a data output register connected to a microprocessor's enable terminal and data storage means and responsive to an enable signal for receiving ciphered data; a cipher processor connected to the register means for receiving data for encryption or decryption selectively;

a microprocessor connected to the register means and to the cipher processor, the microprocessor including an instruction means, and an instruction execution means for cycling through an I/O port read bus cycle, a memory-read bus cycle;

a data storage means connected to the cipher processor and to the microprocessor for storing the ciphered data output of the cipher processor; and a key card interface means connected to the microprocessor, the key card interface means for connection to a key card reader for obtaining key information for the cipher processor;

whereby the microprocessor upon command of the host processor fetches key information from the key card interface means for user authentication and cipher processor code selection and responsive to an authentication signal cycling through an I/O port read bus cycle each time an IN instruction is executed, a memory-read bus cycle for fetching instructions and data for ciphering by the cipher processor, and I/O port write bus cycle each time an OUT instruction is executed for writing data to a specific I/O port address in the I/O address space of the microprocessor storage means, and a memory-write bus cycle each time an instruction is executed to write data to a valid memory location.

2. An encryption/decryption apparatus according to clam 1 wherein the control read/write is a logic circuit means for producing read/write signals for the data storage means and read/write terminals of the microprocessor.

3. An encryption/decryption apparatus according to claim 1 wherein the address storage means and data storage means including, respectively, a plurality of address buffers for storing the host computer's addresses for the host computer data to be ciphered and returned, and a data buffer for storing the data to be ciphered and the ciphered data for return to the host computer.

4. An encryption/decryption apparatus according to claim 1 wherein the key card interface means includes an EEPROM key card reader.

5. An encryption/decryption apparatus according to claim 4 wherein the key card reader further includes secondary key information for the cipher processor for preventing the linkage of files together in storage.

6. An encryption/decryption apparatus according to claim 1 wherein the I/O port read bus cycle of the microprocessor instruction means and instruction execution means includes means responsive to an IN instruction for issuing an instruction to fetch data from I/O port addresses in one of the plurality of address registers, means for determining whether the address bus bits contain a valid I/O port address, means for activating the I/O read bus control for indicating both that the bus cycle is an I/O port read cycle and that the addressed port should respond by driving the data bus with its contents, means connected to the host computer for sampling the data on the data bus, and means for deactivating the I/O read bus signal.

7. An encryption/decryption apparatus according to claim 1 wherein the memory-read bus cycle of the microprocessor instruction means includes means for determining that the address bus contains a valid memory address, means for activating the memory-read bus signal for indicating to the devices attached to the bus that the cycle is a memory-read cycle, said devices responsive to the memory-read cycle indicating signal for driving the data bus with its contents though the cipher processor selectively for encryption and decryption, and means enabling the microprocessor to capture the data from the data bus.

8. An encryption/decryption apparatus according to claim 1 wherein the I/O port write bus cycle of the microprocessor instruction means includes means responsive to an OUT instruction to write data to a specific I/O port address in the I/O address space of the microprocessor, means for indicating that the addresses bus contains a valid port address, means for activating the bus control signal I/O write to indicate that the bus cycle is an I/O port write cycle and means directing the selected port address to take data from the data bus, means instructing the microprocessor to drive the data bus with the data for the port address, and means for de-activation the I/O write bus control signal.

9. An encryption/decryption apparatus according to claim 1 wherein the memory-write bus cycle of the microprocessor instruction means includes means responsive to an instruction to write data to a memory location for activating the microprocessor and its bus buffers for driving an address onto the host computer's system bus, means for indicating the address of the memory location that should accept the data, means enabling the microprocessor to drive the data bus with the data that is to be written in the selected memory location, means indicating that the address bus contains a valid memory address, means for activating the memory write bus signal, and means for driving the host processor's system bus with the ciphered data for storage in the selected memory location and means for deactivating the memory-write signal.

*10. An encryption/decryption apparatus for a computer, said apparatus comprising:*

*an address storage means, a read/write control means, the address storage means for storing addresses for a block of data received for the computer for ciphering and the read/write control means for receiving ciphering operational commands and control signals from the computer;*

*co-ordinating means connected to the address storage means, and control read/write means, for coordinating the data addresses of the computer with addresses for the apparatus;*

*a register selector means connected to the co-ordinating means and to the read/write control means for outputting register selector signals;*

*a register means connected to the read/write control means and responsive to a control signal for storing the computer's data for ciphering, and a data output register connected to a microprocessor and responsive to an enable signal for receiving ciphered data;*

*a cipher processor connected to the register means for receiving data for encryption or decryption selectively;*

*the microprocessor being connected to the register means and to the cipher processor;*

*a data storage means connected to the cipher processor and to the microprocessor for storing the ciphered data output of the cipher processor; and*

*a key card interface means connected to the microprocessor, the key card interface means for connection to a key card reader for obtaining key information for the cipher processor;*

*whereby the microprocessor upon command of the computer fetches key information from the key card interface means for user authentication and cipher processor code selection.*

*11. The apparatus of claim 10 wherein said apparatus further comprises an expander boarder for the expansion slot of a computer.*

*12. The apparatus of claim 10 wherein said co-ordinating means is an auto-start means.*

*13. The apparatus of claim 10 wherein the read/write control is a logic circuit means for producing read/write signals for the data storage means and read/write terminals of the microprocessor.*

*14. The apparatus according to claim 10 wherein the address storage means and data storage means include, respectively, a plurality of address buffers for storing the computer's addresses for the data to be ciphered and returned, and a data buffer for storing the data to be ciphered and the ciphered data for return to the computer.*

*15. The apparatus of claim 10 wherein the key card interface means includes an EEPROM key card reader.*

*16. The apparatus of claim 10 further comprising a memory-write bus cycle of the microprocessor including means responsive to an instruction to write data to a memory location for activating the microprocessor and its bus buffers for driving an address onto the computer's system bus, means for indicating the address of the memory location that should accept the data, means enabling the microprocessor to drive the data bus with the data that is to be written in the selected memory location, means indicating that the address bus contains a valid memory address, means for activating the memory write bus signal, and means for driving the computer's system bus with the ciphered data for storage in the selected memory location and means for deactivating the memory-write signal.*

* * * * *